April 21, 1964

J. DE VORE 3,129,693

HOG FARROWING HUT

Filed Oct. 29, 1962

INVENTOR
JASPER DE VORE

BY

ATTORNEY

April 21, 1964  J. DE VORE  3,129,693
HOG FARROWING HUT
Filed Oct. 29, 1962  2 Sheets-Sheet 2

INVENTOR
JASPER DE VORE

BY

ATTORNEY 3,129,693
HOG FARROWING HUT
Jasper De Vore, R.R. 3, Arkansas City, Kans.
Filed Oct. 29, 1962, Ser. No. 233,564
2 Claims. (Cl. 119—16)

This invention relates to hog shelters, and consists more particularly in new and useful improvements in a hog farrowing hut designed to accommodate a sow and its litter of newborn pigs with a maximum of protection from the elements and safety for the pigs.

It is well-known that without proper precautions, there is an extremely high mortality rate among newborn pigs as a result of suffocation or crushing by the mother sow, and numerous structures have been designed with a view to providing protection. Experience has also shown that hogs dislike confinement and are especially adverse to structures having man-made floors of any type, as it is a hog's nature to lie on the earth.

It is therefore the primary object of the present invention to provide a hog farrowing hut which is peculiarly acceptable to a farrowing sow because it is completely floorless, and, at the same time, affords the required protection from both cold and heat, as well as protection for newborn pigs against suffocation and crushing.

Another object of the invention is to provide a farrowing hut which is readily portable, yet large enough to permit a sow to turn around after she enters and having a sufficiently confined area to retain her body heat, both for her own warmth and that of her pigs.

A further object of the invention is to provide an economical farrowing hut of a durable construction having sufficient strength to accommodate a 600 or 700 pound sow with maximum resistance to side pressures which might otherwise collapse the structure.

Still another object of the invention is to provide a farrowing hut which is sufficiently heavy to prevent the sow from moving it and including means for temporarily anchoring the hut to the earth in such a manner that it cannot be easily pushed by the sow.

Another object of the invention is to provide a novel and effective anchoring means which is adjustable to enable the hut to be secured tightly to the earth in wintertime or to be slightly elevated so as to provide ventilation in the summertime.

A still further object of the invention resides in the particular shape of the hut which is designed to facilitate ease of handling and including an ironclad flat top which not only affords longer life, but facilitates transportation upside down.

Another object of the invention is to provide a doorway in the front wall of the hut which admits sufficient fresh air and sunshine, but, at the same time, prevents the escape of heat in extremely cold weather when the sow is farrowing.

A further object of the invention is to provide a closure rail for the hut doorway having a novel protecting strip designed to serve the dual purpose of confining the small pigs within the hut, while permitting the entrance and exit of the sow, and at the same time, protects the sows udders from injury in passing over the rigid closure rail.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views.

Figure 1:
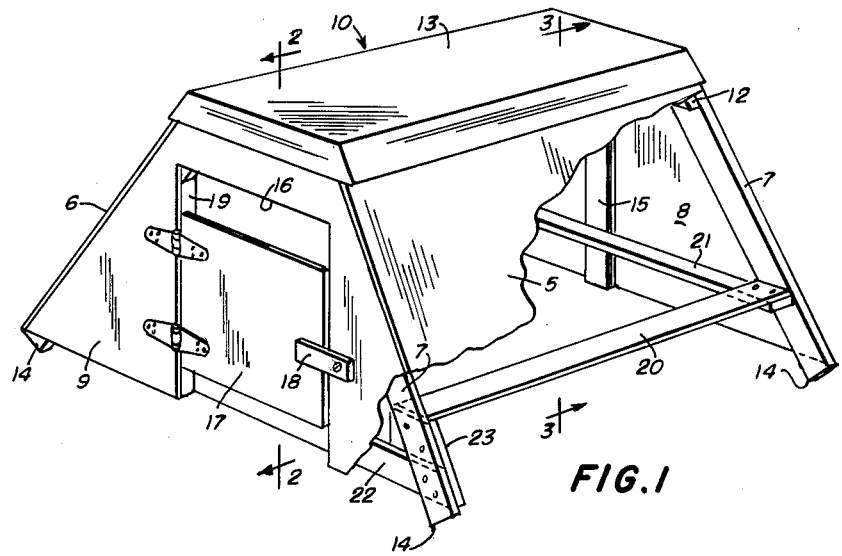
FIG. 1 is a perspective view of the farrowing hut of the present invention with parts of one side wall and the front wall broken away to illustrate the interior.

As seen in the drawings, the hut comprises a relatively low wide-based housing, and although not to be considered as specifically limiting the dimensions thereof, it has been found that the most practical results can be obtained with a hut approxiamtely 6 feet in length and 6 feet, 8 inches wide at the base of the side walls which lie in upwardly and inwardly converging planes and are connected by a flat top, spaced vertically from the lower extremity of the hut a distance of approximately 3 feet, 2 inches. The angle of inclination of the side walls is such as to afford a maximum of ground area for movement of the sow and pigs while limiting the overall interior space to effectively retain the body heat of the sow.

More specifically, the hut comprises two side walls 5 and 6, each preferably composed of one-piece half inch exterior plywood and supported in upwardly and inwardly inclined relation by four corner frame members 7 of two by four lumber, to which the side walls are firmly secured by any suitable means. The rear wall 8 and front wall 9 are also preferably composed of one-piece exterior plywood cut to the angular shape defined by the converging side walls and similarly secured to the four corner frames 7.

Figure 2:
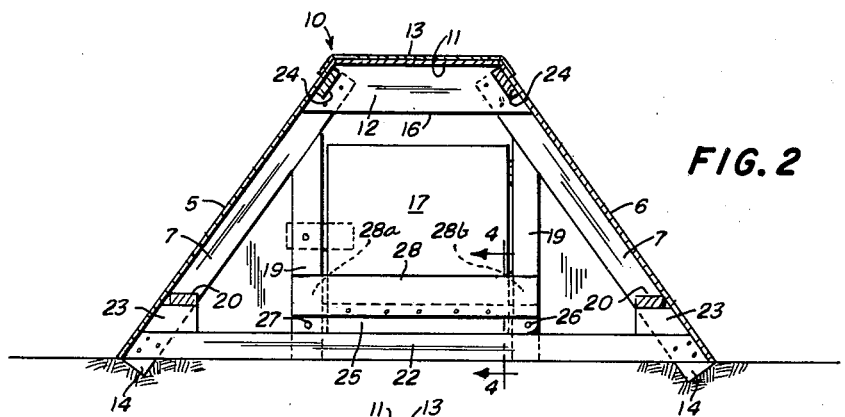
FIG. 2 is a sectional view taken on line 2—2 of FIG. 1, showing the front wall and door of the hut from the interior.
Figure 3:
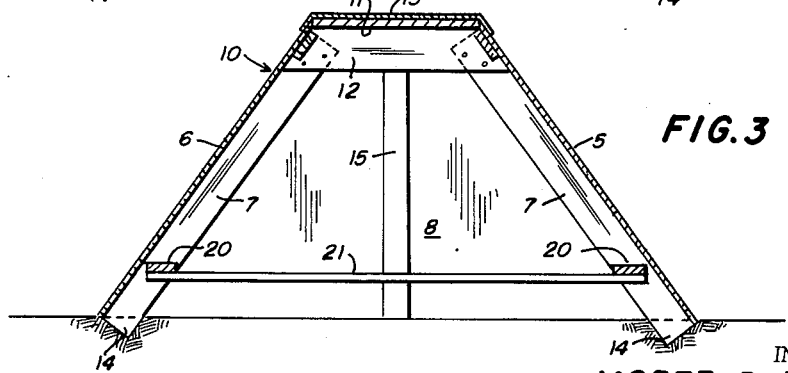
FIG. 3 is a similar sectional view taken on line 3—3 of FIG. 1, showing the interior of the rear wall of the hut.

As best seen in FIGS. 2 and 3, the top which is generally indicated by the numeral 10, comprises a sheet of insulating sheathing board 11 extending the full length of the side walls and preferably of a width of approximately 1 foot, 10 inches, supported at each end of the hut by cross-pieces 12 which are suitably secured to the upper ends of the corner frames 7. The flat top 10 is ironclad by providing a sheet of galvanized iron or other suitable wear-resistant material 13 which overlies the insulating board 11 and is turned down on all four sides as shown in FIG. 1, providing an air-tight top which is firmly secured to the underlying structure.

The lower diverging ends of the corner frames 7 extend partially below the lower extremities of the side walls and front and rear walls so that their angularly presented lower corners 14 serve as ground engaging anchoring members adapted to penetrate the ground at the four corners of the hut as shown in FIGS. 2 and 3, to prevent shifting of the hut either longitudinally or transversely by the movement of a sow therein.

A vertical frame member 15 extending the full height of the rear wall 8 supports the central portion of that wall and adds strength to the rear end of the hut. The front wall 9 is provided with a doorway 16 equipped with a suitably hinged door 17 which is maintained in closed position by any convenient locking device such as 18. The height of the door 17 is sufficiently less than the overall height of the doorway 16 to provide ventilating spaces at top and bottom when the door is in closed position as shown in FIG. 1, so that air can circulate through the interior of the hut. Vertical framing members 19 are secured to the inner face of the front wall 9 to serve the dual purpose of adding strength to the doorway and front wall, and they are slightly inwardly offset to act as abutments for the adjacent edges of the door 17 when it is closed.

The framing for the lower portion of the hut comprises two longitudinally extending guard rails 20 and a rear end guard rail 21 which are vertically spaced from the lower edge of the hut walls to afford protecting areas into which small pigs can easily crawl out of the way of the sow. Thus, the rails 20 and 21 serve the dual purpose of frame members and pig guards.

A cross frame 22 extends across the interior at the bottom of the front wall 9 and is connected at opposite ends to the front corner frames 7, and spacers 23 secured to the front corner frames 7 support the forward ends of the side guard rails 20. It may also be advisable to provide longitudinally extending frame members 24 adjacent the upper edges of the side walls 5 and 6 to insure sufficient strength of the upper portion of the hut to permit it to be hauled and transported upside down, as will later appear.

As best seen in FIG. 2, a closure rail 25 is pivotally mounted as at 26 to one of the vertical frame members 19 and adapted to be swung upwardly when not in use. This closure rail extends across the doorway 16 just above the front frame member 22 and can be held in its lowered position by inserting a suitable pin or bolt 27 in registering holes in the guard rail and frame member 19. Normally, this closure rail would be bolted in upright position, but as soon as the sow farrows, it would be dropped across the doorway and bolted to prevent the small pigs from escaping.

I have also found that the efficiency of this closure guard rail 25 can be improved by securing a strip of rubber drive belting 28 to the inner face of the rail so that its upper edge extends considerably above the rail, as best seen in FIG. 2. As will be seen, the strip 28 extends completely across the doorway and for the full length of the rail 25, being secured to the rail along its lower longitudinal edge only, with its upper longituidnal edge and ends free, and while the strip is sufficiently rigid to sustain itself in vertical position, it has enough flexibility to flex outwardly and permit the sow to climb over the rail when the door 17 is open. However, inasmuch as the strip 28 extends entirely across the doorway with its ends adjacent the frame members 19, it prevents the small pigs from escaping. Without this flexible feature, a sow is likely to injure her udders if she drags her underline over a rigid closure rail of this height.

Figure 4:
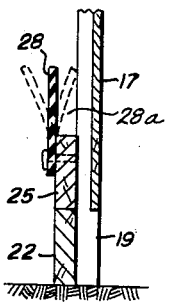
FIG. 4 is a fragmentary sectional view taken on line 4—4 of FIG. 2, showing the closure rail and protecting strip.

Also, by connecting the strip of belting 28 along its lower edge only, with its longitudinal extremities overlapping but disconnected from the door frame members 19, the strip acts in the nature of a check valve for preventing the escape of small pigs. In other words, if a small pig should climb upon a sow's body and fall over the guard rail, it can easily get back into the hut by crawling through one of the spaces 28a or 28b between the ends of the strip and the face of the door frame, due to the flexibility of the strip, as seen in FIG. 4. However, the pigs cannot exit by this means, as the belting cannot be readily flexed outwardly to any appreciable extent without abutting the adjacent surfaces of the door facing 19, thus acting as a check valve, as before stated. Of course, the strip 28 can be flexed either inwardly or outwardly by the sow due to her size and weight, regardless of the abutment of the ends of the strip with the door facing.

FIGS. 5–8 inclusive illustrate my improved hut anchoring device which comprises a mounting plate 30, adapted to be secured to a corner of the hut by screws or the like which extend through suitable openings 33. On the front face of the plate 30. I weld or otherwise secure a pair of vertically spaced, oppositely disposed, right angular brackets 31 and 32, adapted to engage an anchor rod 34. The anchor rod per se may be of any conventional type, but preferably includes a screw-type anchor plate 35 at its lower end which screws into the ground and firmly supports the rod 34. Anchors of this type are available on the market.

Figures 5, 6:
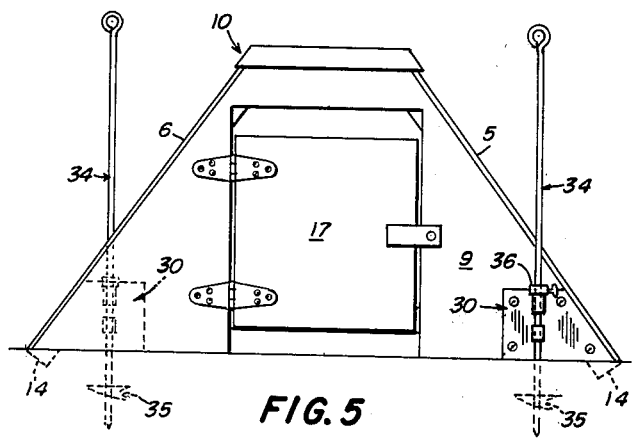
FIG. 5 is a front elevation of a hut provided with my improved anchoring device and adjusted to maintain the hut in tight engagement with the earth.
FIG. 6 is a similar fragmentary showing but with the anchoring device adjusted for elevating the hut from the earth.
Figure 7:
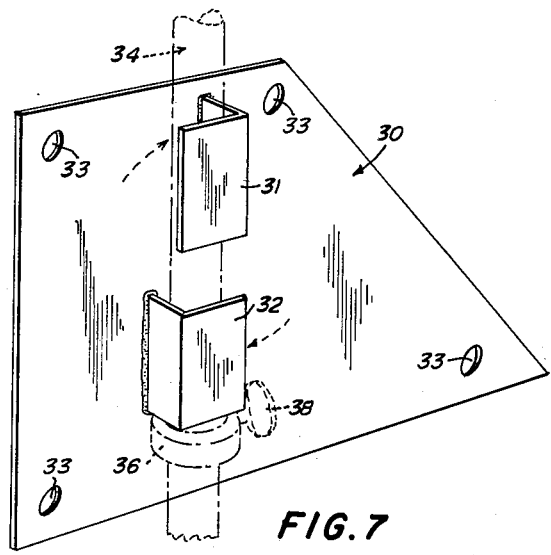
FIG. 7 is a detailed perspective view of the anchor securing plate.
Figure 8:
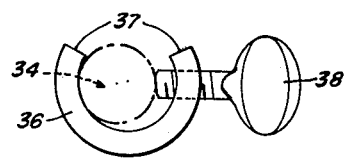
FIG. 8 is a detailed showing of the adjusting clamp for the anchor device.

With this arrangement, after the hut is properly located, the anchor rod 34 is inserted horizontally in the space between the two brackets 31 and 32, and then shifted vertically as shown in FIG. 7, so that it enters bracket 31 from the left and bracket 32 from the right until it finally abuts the forwardly directed legs of the respective brackets. While four of these anchor devices may be employed, one at each corner, it has been found that two diagonally opposed devices as shown in FIG. 5 will suffice. After the anchor rods 34 are in place and screwed into the ground, a C-shaped clamp 36 having an opening 37, is slipped onto the anchor rod 34 as shown in FIG. 8, and the thumb screw 38 is tightened until the clamp firmly grips the anchor rod.

In the wintertime, when it is desired to firmly secure the hut close to the ground, the clamp 36 is secured to the rod 34 above and in engagement with the top edge of the uppermost bracket 31, as seen in FIG. 5, thus preventing any vertical movement of the hut with respect to the rod 34. In the summertime, when it is desired to elevate the hut so as to provide an air space beneath the same, the clamp 36 is secured beneath and in engagement with the lower edge of the lowermost bracket 32, as shown in FIG. 6. The clamp thereby supports the hut at any desired level. If only two of these anchor devices are employed and arranged diagonally opposite, as above suggested, the other two corners of the hut may be supported by blocks or bricks to prevent tilting.

In the use of hog farrowing huts constructed in accordance with the present invention, a number of huts can be spaced at suitable intervals, preferably in a terraced field or pasture, and by bouncing the hut up and down several times, the thin ½ inch plywood sides settle into any high spots to prevent cold air from blowing in underneath. At the same time, the corners 14 of the four frame members 7 dig into the ground and temporarily anchor the hut to prevent movement by the sows. The more permanent anchoring devices as shown in FIG. 7 may then be adjusted in place. The huts may be easily moved to facilitate cleaning, and when they are transported from one pasture to another, the smooth ironclad top 10 is of sufficient width and strength to permit the huts to be placed on their tops in inverted position and easily loaded in pick-up trucks without injury.

From the foregoing, it is believed that the invention may be readily understood by those skilled in the art without further description, it being borne in mind that numerous changes may be made in the details disclosed without departing from the spirit of the invention as set forth in the following claims.

I claim:

1. In a hog farrowing hut, door frame members in one wall thereof forming a doorway, a door for said doorway, an auxiliary closure rail pivoted at one end to one frame member adjacent the lower portion of the latter and swingable from a vertical position clear of the doorway, to a horizontal position closing the lower area of the doorway, an upstanding strip of flexible material of self-sustaining rigidity secured along its lower longitudinal edge only, to said rail and extending across the full width of said doorway with its longitudinal extremities in inwardly spaced relation to the adjacent door frame members, whereby the upper portion of said strip may be readily flexed along its full length, inwardly of said doorway, but its outward flexing is minimized by contact of its ends with the adjacent door frame members.

2. A floorless hog farrowing hut, comprising a pair of side walls, relatively wide spread at their base edges and lying in upwardly converging planes, a flat top connecting the upper edges of said side walls, corner frame members supporting the longitudinal extremities of said side walls, front and rear end walls for said hut, a doorway in said front wall, a door for said doorway, pig guard rails spaced upwardly from the lower edges of said side walls and serving as horizontal frame members for said corner frames, and an auxiliary closure rail adapted to partially close said doorway when said main door is open, said auxiliary closure rail being provided along its upper edge with an upstanding, longitudinally extending strip of flexible material of self-sustaining rigidity.

References Cited in the file of this patent
UNITED STATES PATENTS

| | | |
|---|---|---|
| 2,008,637 | Burrus et al. | July 16, 1935 |
| 2,712,677 | Hyde | July 12, 1955 |
| 2,987,043 | Spindler | June 6, 1961 |